(12) United States Patent
Fackenthal

(10) Patent No.: US 6,625,716 B2
(45) Date of Patent: Sep. 23, 2003

(54) METHOD APPARATUS, AND SYSTEM FOR EFFICIENT ADDRESS AND DATA PROTOCOL FOR A MEMORY

(75) Inventor: Richard Fackenthal, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 09/895,987

(22) Filed: Jun. 28, 2001

(65) Prior Publication Data

US 2003/0028744 A1 Feb. 6, 2003

(51) Int. Cl.[7] ............... G06F 12/02; G06F 13/16
(52) U.S. Cl. ............... 711/211; 711/1; 365/230.02
(58) Field of Search ............... 711/211, 1; 365/230.02, 365/233, 233.05, 230.01

(56) References Cited

U.S. PATENT DOCUMENTS

| | | | | |
|---|---|---|---|---|
| 5,175,836 A | * | 12/1992 | Morgan | 711/172 |
| 5,530,965 A | | 6/1996 | Kawasaki et al. | 712/38 |
| 5,600,606 A | * | 2/1997 | Rao | 365/233 |
| 5,652,870 A | * | 7/1997 | Yamasaki et al. | 703/23 |

FOREIGN PATENT DOCUMENTS

| | | |
|---|---|---|
| EP | 0 905 631 A2 | 3/1999 |
| WO | WO 91/02311 | 2/1991 |

* cited by examiner

*Primary Examiner*—Gary Portka
(74) *Attorney, Agent, or Firm*—Blakely, Sokoloff, Taylor & Zafman LLP

(57) ABSTRACT

A memory to support an Address-Data Multiplexed protocol in response to a substantially simultaneous assertion of RAS and CAS, and an Address—Address Multiplexed protocol in response to an assertion of RAS followed by an assertion of CAS.

31 Claims, 3 Drawing Sheets

METHOD APPARATUS, AND SYSTEM FOR EFFICIENT ADDRESS AND DATA PROTOCOL FOR A MEMORY

BACKGROUND OF THE INVENTION

1. Field of the Invention

The present invention relates generally to memory, and more specifically to address and data protocol for a memory device.

2. Description of the Related Art

The demand for more powerful computers and circuit boards has led to advances in the technology industry. However, a designer struggles with improving performance while minimizing the amount of pins needed for the design. For example, if a printed circuit board (PCB) is designed for a cellular application, the PCB designer needs to incorporate performance features such as supporting wireless standards and audio/video transmission and reception. However, the PCB designer also needs to minimize the size of the PCB by minimizing the number of pins to improve manufacturing efficiency because of the difficulty of routing signals on a large PCB with a substantial number of functional pins.

A typical solution, Address-Data Multiplexed Protocol, is illustrated in FIG. 1. The timing diagram 100 illustrates a protocol for multiplexing address and data information on pins, and IN and OUT refers to whether the information is being received by the memory device (IN) or is being sent by the memory device (OUT). The address pins are designated as 110, and are labeled A[7:0] to indicate eight address bits. The data pins are designated as 120, and are labeled D[15:0] to indicate sixteen data bits. This protocol allows the data pins to serve multiple functions based on a control pin and the direction of communication between the central processor unit (CPU) and the memory. For example, the CPU needs to send a read request to the memory with twenty-four bits of address information. However, the eight address pins are not sufficient to transmit the read request in one clock cycle. To solve this problem, the sixteen data pins are used to send the rest of the address information to the memory device. After the memory has retrieved the data based on the address of the read request sent during clock cycle t0, the memory sends the information on the data pins back to the CPU during clock cycle t7.

Another typical solution, Address—Address Multiplexed Protocol, is illustrated in FIG. 2. The timing diagram 200 illustrates a protocol for multiplexing address information on pins. The row address strobe (RAS) 210, and column address strobe (CAS) 220 are the control signals. Both signals are labeled with a # to indicate the signals are active for a logic value of zero. The address pins are designated as 230 and are labeled A[11:0] to indicate twelve address bits. The data pins are designated as 240, and are labeled D[15:0] to indicate sixteen bits of data information. As an example, the CPU sends twelve address bits during clock cycle t0 when RAS# is low, and sends another twelve address bits during clock cycle t1 when CAS# is low. This protocol allows for the address pins to send twenty-four bits, while only utilizing twelve address pins. FIG. 3 illustrates the Address—Address Multiplexed Protocol with a burst operation, wherein the memory device retrieves information based on the twenty four address bits for a read request sent during clock cycles t0 and t1. The memory sends the data associated with the read request during clock cycle t7. Also, the burst allows the memory device to send the data associated with the seven consecutive address locations during clock cycles t8–t14. The typical address protocols have a disadvantage.

Therefore, the Address—Address Multiplexed Protocol degrades performance because it requires two clock cycles to send the address to the memory. In contrast, Address-Data Multiplexed Protocol sends the address in one clock cycle. However, this protocol does not support a burst as discussed in FIG. 3 since the data pins are occupied with data on clock cycle t7, and cannot send address information during clock cycle t7.

Another typical solution is designing a bus to transmit address, data, and control information in a time-multiplexed manner. However, this requires a complex state machine which increases design time and complexity.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

A method, system, and apparatus for communicating to a memory, and more specifically an address and data protocol for a memory device. In the following description, for purposes of explanation, numerous details are set forth in order to provide a thorough understanding of the present invention. However, it will be apparent to one skilled in the art that these specific details are not required in order to practice the present invention.

Figure 4:
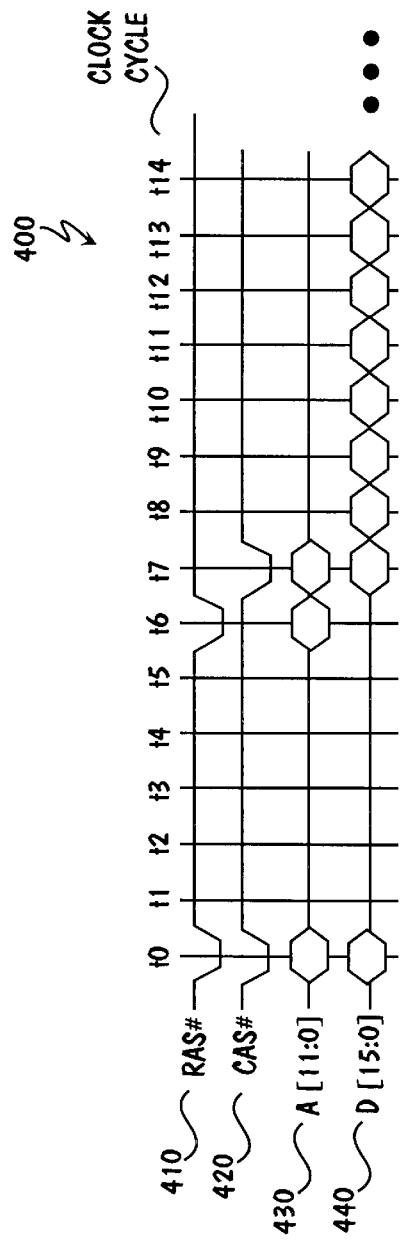
FIG. 4 shows a timing diagram in accordance with one embodiment of the present invention.

FIG. 4 illustrates a timing diagram 400 in accordance with one embodiment of the present invention. The timing diagram illustrates one embodiment for multiplexing address information on address and data pins in an efficient manner to allow for supporting multiple protocols. For example, the timing diagram includes, but is not limited to, a row address strobe (RAS) 410 and a column address strobe (CAS) 420. In one embodiment, both signals are labeled with a # to indicate the signals are active for a logic value of zero. Also, the timing diagram depicts a plurality of address pins as 430, and in one embodiment are labeled A[11:0] to indicate twelve address bits and the data pins are 440, and are labeled D[15:0] to indicate sixteen bits of data information. The horizontal labels such as t0, t1, thru t14, represent clock cycles.

Figure 1:
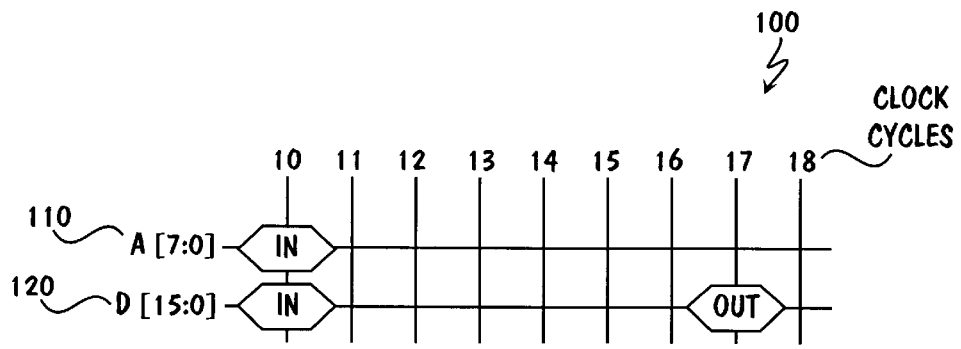
FIGS. 1, 2, and 3 are prior art.
Figure 2:
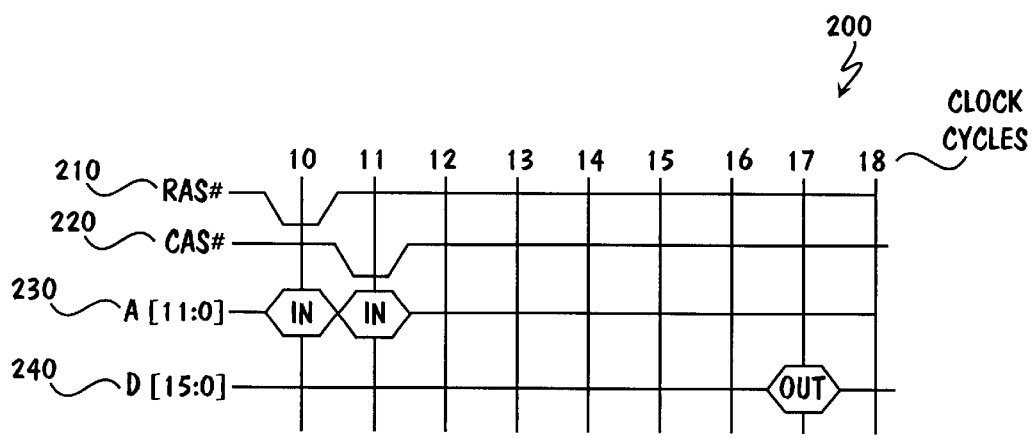
Figure 3:
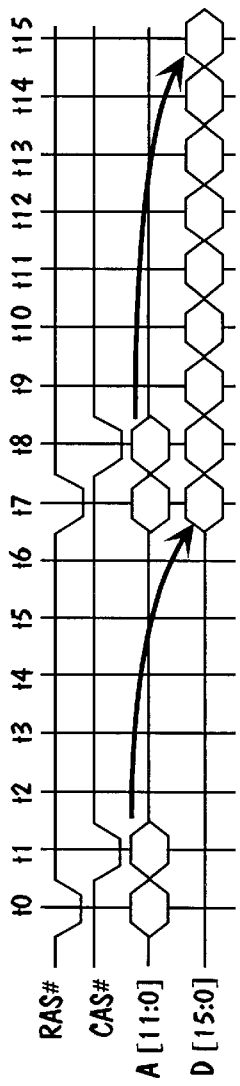

The invention supports multiplexing between multiple address and data protocols. In one embodiment, the timing diagram 400 allows for multiplexing between a modified version of an Address-Data Multiplexed Protocol of FIG. 1 and an Address—Address Multiplexed Protocol of FIG. 2. Also, the timing diagram 400 may support the burst operation of FIG. 3. For example, during clock cycle t0, RAS# and CAS# have a zero value that initiates the memory to receive the address information for a burst operation from the address pins 430 and the data pins 440 in one clock cycle t0. Thus, in one embodiment, the memory device receives twenty-eight address bits of information from the twelve dedicated address pins plus the sixteen data pins. Also, the previously discussed protocol illustrated in clock cycle t0 is a modified version of Address-Data Multiplexed Protocol because of the introduction of RAS# and CAS# as control signals which initiates the memory to latch the address information when both control signals are low.

Proceeding on with the timing diagram 400, after the memory device has received the twenty-eight bits of address information in clock cycle t0, it starts the process of retrieving the data associated with the address information. However, memory devices have an inherent delay or latency because they need to decode the address, enable the associated wordlines and bitlines, and sense the data stored in the address location. In one embodiment, the latency is six clock cycles. Thus, after the memory has retrieved the data, the memory device is ready to return the first word of data information in clock cycle t6 and the successive words of the data information for the burst operation in clock cycles t7–13. In one embodiment, the memory device may forward the data to the CPU via the data pins 440. In another embodiment, the memory device may forward the data to a memory controller via the data pins 440. In yet another embodiment, the memory device may forward the data to a microcontroller via the data pins 440.

Continuing on with timing diagram 440, while the memory device is sending data in clock cycle t6 that is associated with the request back from clock cycle t0 for a modified version of an Address-Data Multiplexed Protocol, the memory device may also receive new address information during clock cycles t7 and t8 via the address pins 430. Starting with clock cycle t7, the timing diagram incorporates the Address—Address Multiplexed Protocol. For example, in one embodiment the timing diagram receives a total of twenty-four address bits during two clock cycles: twelve address bits during clock cycle t7 when RAS# is a zero value and another twelve address bits during clock cycle t8 when CAS# is a zero value. In one embodiment, the memory device utilizes a subset of the data signals that are needed to address the memory device. For example, a memory device capable of storing 256 Mb (million bits) of data would require twenty-four address bits, coming from only twelve of the data signals and the twelve address signals, to address the memory. As the memory density increases, the number of address bits to address the memory device also increases. Another example would be a memory device capable of storing 512 Mb of data would require only twenty five address bits, coming from thirteen of the data signals and the twelve address signals. Conversely, if a smaller memory density is required such as a 128 Mb device, then only twenty three address bits are required, coming from eleven of the data signals and the twelve address signals. Thus, the timing diagram allows flexibility by supporting a variety of memory device densities and allows for future density upgrades or downgrades. In another embodiment, the invention is capable of supporting multiple memory devices with different memory densities, which is discussed further in FIG. 5.

The sixteen data pins, 440, are capable of supporting both address and data information. During one protocol, the data pins 440 are capable of sending address bits to the memory. In contrast, during another protocol, the data pins 440 are receiving data information from the memory.

Those skilled in the art will further appreciate utilizing various embodiments. For example, rather than having only twelve address bits and sixteen data bits, the invention can support multiple address and data sizes. If a system designer or end user prefers a smaller memory size, the number of address pins can be decreased. In contrast, if a system designer or end user prefers a larger memory size, the number of address pins can be increased. Also, if a system designer or end user prefers shorter or longer burst operations, the invention can support the modification. Also, rather than utilize a burst operation, the invention supports non-burst operations such as conventional one-word access operations.

One skilled in the art appreciates the ability to change the latency of the memory device to accommodate design specifications. For example, as discussed in FIG. 4, the latency of the memory was six cycles. However, a system designer could increase the latency by programming a delay into a register which counts down to zero, and the memory would respond to the read request after the counter reaches zero In contrast, as memory performance is increased due to design and process improvements, the latency could decrease to fewer than six clock cycles. Also, RAS# and CAS# were depicted as control signals for enabling a particular protocol. Utilizing RAS# and CAS# is an economical use of pins because dynamic random access memories (DRAMS) utilize RAS# and CAS# signals for refresh operations. An alternative embodiment is the invention can utilize other pins to select a protocol. As an example, a functional pin could support two protocols or two functional pins can support three or four protocols. As depicted earlier, the invention was capable of multiplexing between a modified version of an address-data multiplexed protocol and an address—address multiplexed protocol in response to control signals, RAS and CAS. However, the invention can support multiple variations. For example, the invention can utilize a mode control signal for one protocol, while utilizing RAS and CAS for another protocol.

Figure 5:
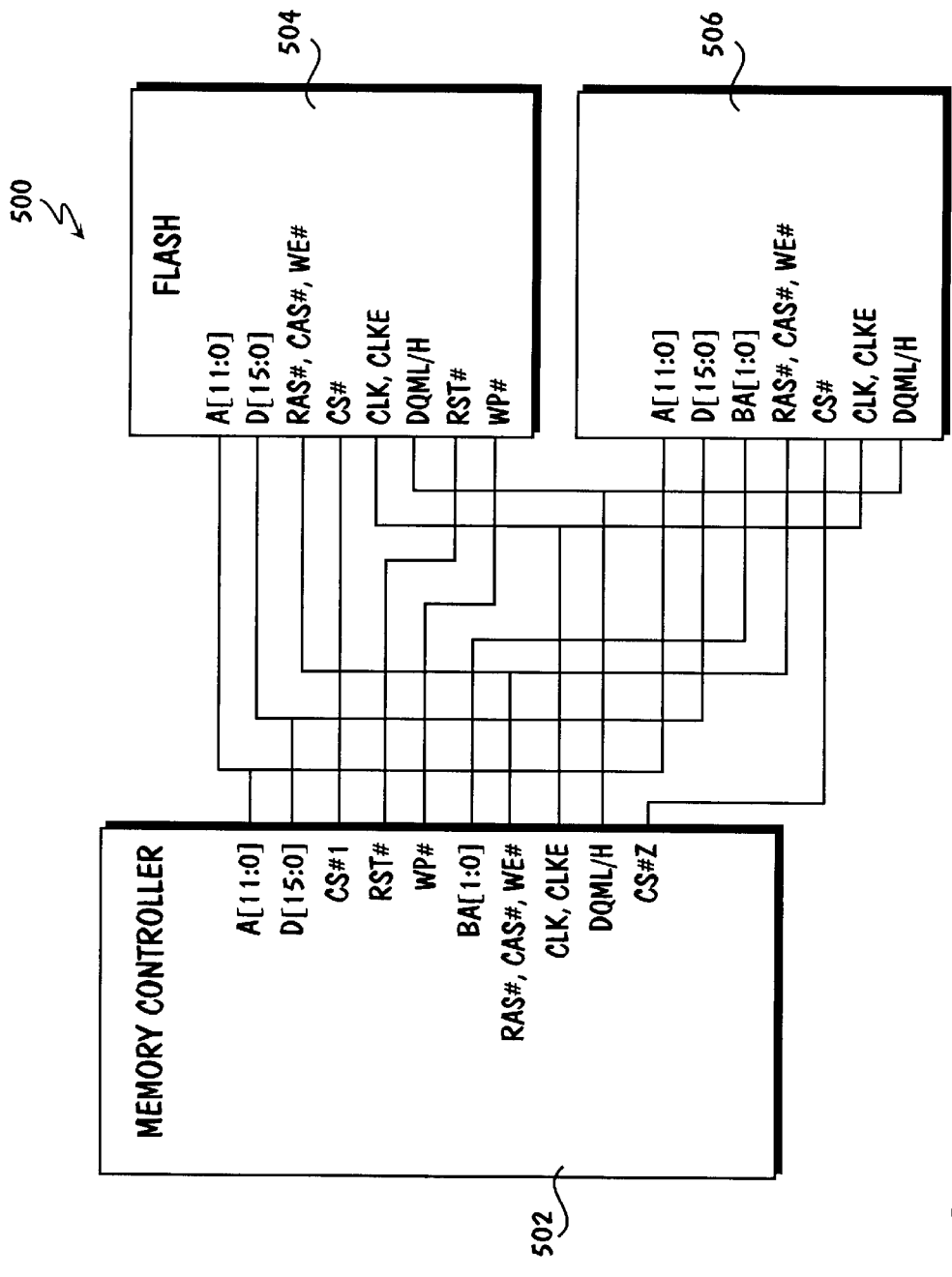
FIG. 5 shows a system in accordance with one embodiment of the present invention.

FIG. 5 illustrates a system in accordance with the present invention. In one embodiment, the system 500 includes but is not limited to a memory controller 502, a flash memory 504, and a synchronous dynamic random memory (SDRAM) 506. In another embodiment, the system contains a plurality of SDRAMs devices and a single flash memory. In another embodiment, the system contains a plurality of flash memories and a single SDRAM. In yet another embodiment, the system contains a plurality of flash memories and a plurality of SDRAMs.

In one embodiment, the flash memory 504 stores various code and user data and the SDRAM stores working data such as buffers and variables needed during the operation of the system.

In one embodiment, the memory controller is embedded in a processor. In another embodiment, a chipset comprises the memory controller. In one embodiment, the flash memory 504 and SDRAM 506 are embedded in the system. In another embodiment, the flash memory 504 or SDRAM 506 is external to the system.

The memory controller 502 comprises multiple pins. A first set of pins such as D[15:0] is capable of sending address bits during the Address-Data Multiplexed Protocol to supplement the address bits from the A[11:0] pins, or sending data bits during the Address—Address Multiplexed Protocol. The CLK and CLKE pins supply the clock and clock enable. In one embodiment, the RST# pin and WP# pin communicates only with the flash memory. The RST# pin inhibits write operations and the WP# pin is a write protect and is a toggle for the lock-down function.

In one embodiment, the memory controller is capable of multiple functions for each set of pins to allow for increased flexibility. For example, a BA[1:0] is capable of supplying bank address bits for a SDRAM device 506, as well as allowing for additional address bits for density upgrades for the flash memory 504. Also, the CS# pins are a chip selection function for the SDRAM and a power mode for the flash memory. Alternatively, the CS# pin is a chip select for the flash memory. Similarly, the WE# pins are a write enable for the SDRAM and issue command cycles to the flash memory. The RAS# and CAS# pins are a Row Address Strobe and a Column Address Strobe. In one embodiment, the RAS# and CAS# pins for a SDRAM can serve multiple functions based on their respective timing cycles. For example, the RAS# and CAS# pins are the address enable pins and allow for receiving a row address if RAS# is enabled, and allow for receiving a column address if the CAS# is enabled. Also, RAS# and CAS# allow for various refresh modes for the SDRAM, and are the control pins for multiplexing between address-data multiplexed protocol and the address—address multiplexed protocol for the flash memory. Thus, the memory controller is flexible by supporting different memory devices with or without different density sizes, and minimizes the number of functional pins because the memory controller pins are capable of multiple functions.

The memory controller 502 is capable of receiving instructions from the system or from an external processor. In one embodiment, the memory controller 502 is capable of supporting volatile memory and non-volatile memory, as illustrated in FIG. 5 since flash memory is non-volatile and SDRAM is volatile memory. Also, the memory controller is capable of supporting multiple memory devices with different memory densities. For example, in one embodiment the memory controller is capable of supporting the timing diagram 400, which was discussed in FIG. 4. In one addressing mode, the memory controller can supply up to twenty-eight address bits to one of the memory devices by utilizing the twelve address bits, A[11:0]. The flash memory 504 or SDRAM 506 is capable of utilizing a subset of the address bits supplied by the memory controller. For example, if the memory controller transmits twenty-eight address bits during the address-data multiplexed protocol to the SDRAM 506, and the SDRAM's density is only 256 Mb, the SDRAM only needs twelve address bits. Also, if the flash memory 504 is a 256 Mb×16 density, it requires 24 address bits to decode the address, twelve from the address pins and the other twelve from the data pins. As the need for memory density increase, the memory controller is capable of supporting density upgrades in the flash memory or SDRAM memory up to four Gb (gigabits) of storage.

Those skilled in the art will further appreciate utilizing various embodiments. For example, the system 500 is capable of supporting multiple memory device types with similar or different densities. Also, as the memory densities increase or decrease, the corresponding number of address and data bits can increase or decrease.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is contemplated, therefore, that such modifications can be made without departing from the spirit or scope of the present invention as defined in the appended claims.

What is claimed is:

1. A system comprising:
   at least one memory device, coupled to the system, to support an Address-Data Multiplexed protocol in response to a substantially simultaneous assertion of a Row Address Strobe (RAS) signal and a Column Address Strobe (CAS) signal and
   to support an Address—Address Multiplexed protocol in response to an assertion of RAS followed by an assertion of CAS.

2. The system of claim 1 wherein the Address-Data Multiplexed protocol allows the memory device to receive an address from a plurality of address pins and from a plurality of data pins in one clock cycle.

3. The system of claim 1 wherein the Address—Address Multiplexed protocol allows the memory device to receive an address from a plurality of address pins in at least two clock cycles.

4. The system of claim 2 wherein the plurality of address pins is twelve and the plurality of data pins is sixteen.

5. The system of claim 3 wherein the plurality of address pins is twelve.

6. The system of claim 1 wherein the memory device is coupled to an embedded memory controller.

7. The system of claim 1 wherein the memory device is coupled to a memory controller.

8. The system of claim 1 wherein the memory device is coupled to a central processor unit.

9. The system of claim 1 wherein the memory device is coupled to a microcontroller.

10. The system of claim 1 wherein the memory device is a flash memory.

11. The system of claim 1 wherein the memory device is a flash memory embedded within the system.

12. The system of claim 1 wherein the memory device is a synchronous dynamic random access memory (SDRAM).

13. The system of claim 1 wherein the memory device is an embedded synchronous dynamic random access memory (SDRAM).

14. An apparatus comprising:
   a memory controller; and
   a memory, coupled to the memory controller, to multiplex between an Address-Data Multiplexed protocol and an Address—Address Multiplexed protocol in response to either;
   substantially simultaneous assertion of a Row Address Strobe (RAS) signal and a Column Address Strobe (CAS) signal;
   or an assertion of RAS followed by an assertion of CAS.

15. The apparatus of claim 14 wherein the Address-Data Multiplexed protocol allows the memory to receive an address from a plurality of address pins and from a plurality of data pins in one clock cycle.

16. The apparatus of claim 14 wherein the Address–Address Multiplexed protocol allows the memory to receive an address from a plurality of address pins in at least two clock cycles.

17. The apparatus of claim 14 wherein the memory is a synchronous memory device.

18. The apparatus of claim 14 wherein the memory is a flash memory.

19. The apparatus of claim 14 wherein the memory device is an embedded flash memory.

20. The apparatus of claim 14 wherein the memory device is a synchronous dynamic random access memory (SDRAM).

21. The apparatus of claim 14 wherein the memory device is an embedded synchronous dynamic access random memory (SDRAM).

22. The apparatus of claim 15 wherein the plurality of address pins is twelve and the plurality of data pins is sixteen.

23. The apparatus of claim 16 wherein the plurality of address pins is twelve.

24. A method to communicate with a memory comprising:
   sending a first address for an Address-Data Multiplexed protocol to the memory in response to a substantially simultaneous assertion of a Row Address Strobe (RAS) signal and a Column Address Strobe (CAS) signal; and sending a second address for an Address—Address Multiplexed protocol to the memory in response to an assertion of RAS followed by an assertion of CAS.

25. The method of claim 24 further comprising receiving at least one data bit from the memory for the Address-Data Multiplexed protocol and the Address—Address Multiplexed protocol.

26. The method of claim 24 wherein the Address-Data Multiplexed protocol allows the memory to receive the first address from a plurality of address pins and from a plurality of data pins in one clock cycle.

27. The method of claim 24 wherein the Address—Address Multiplexed protocol allows the memory to receive the second address from a plurality of address pins in at least two clock cycles.

28. The method of claim 24 wherein the memory is a flash memory.

29. The method of claim 24 wherein the memory is an embedded flash memory.

30. The method of claim 24 wherein the memory device is a synchronous dynamic random access memory (SDRAM).

31. The method of claim 24 wherein the memory device is an embedded synchronous dynamic random access memory (SDRAM).

* * * * *